Sept. 5, 1933.  J. F. SKINNER  1,925,679
SEWAGE TREATING APPARATUS
Original Filed Oct. 21, 1929
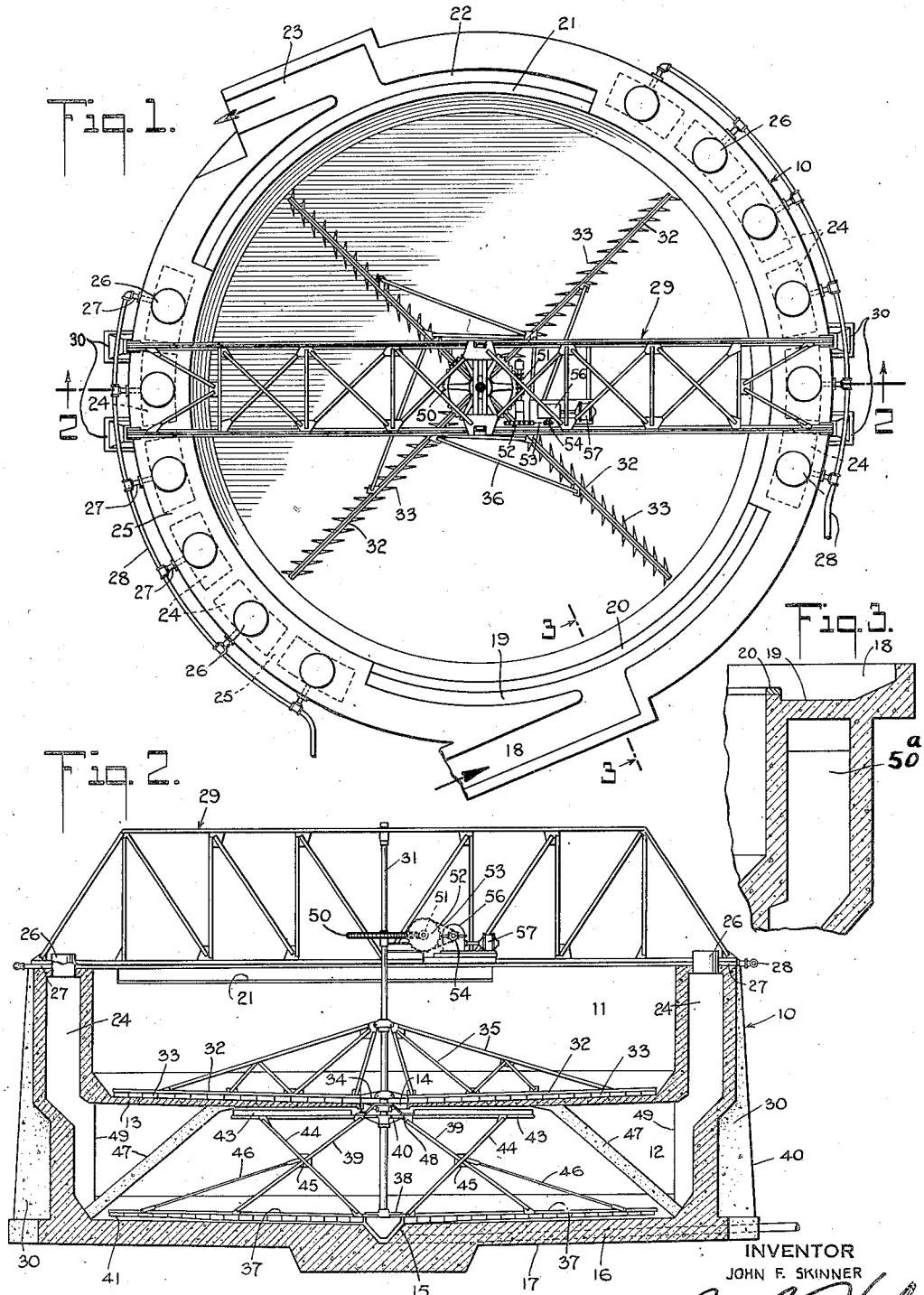
INVENTOR
JOHN F. SKINNER Patented Sept. 5, 1933

1,925,679

UNITED STATES PATENT OFFICE 1,925,679

SEWAGE TREATING APPARATUS

John F. Skinner, Rochester, N. Y., assignor, by mesne assignments, to The Dorr Company, Inc., New York, N. Y., a corporation of Delaware Application October 21, 1929, Serial No. 401,131
Renewed February 15, 1932

15 Claims. (Cl. 210—2)

This invention relates to an apparatus and method for the treatment of sewage and more particularly to a combined clarifier and anaerobic digestion apparatus with the method of operation thereof.

In the treatment of sewage by anaerobic digestion it is the practice to remove the digestible solids by sedimentation and then to subject such solids to detention in the absence of air for a period sufficient to permit anaerobic bacteria to complete their digestive action, producing an innocuous and unobjectionable sludge. For carrying out these steps it has been the practice for many years to incorporate the sedimentation compartment and the digestion compartment in a single tank, such for instance as the well known two story or Imhoff tank. In constructions of this type the upper compartment acts as a plain sedimentation compartment, the clarified liquid overflowing while the settled solids or sludge, composed almost entirely of digestible organic matter, are discharged into the lower compartment, which is of sufficient depth to accommodate the sludge for the relatively long period necessary to complete bacterial action, the digested sludge being withdrawn from the bottom of the digestion compartment.

In apparatus of this type it has heretofore been the practice to discharge the settled solids from the upper compartment to the lower by gravity, for which purpose it was necessary that the sides and bottom of the upper compartment should have a very steep slope, since retention of the raw sludge in the upper compartment for any appreciable time results in septic or acid digestion, and such septic sludge when introduced into the lower compartment tends to inhibit anaerobic digestion until the septic action is completed. Consequently tanks of this type have had to be designed with very great overall depth, owing to the necessity for providing sharply sloping side walls and bottoms, thereby requiring either excessively deep and expensive excavation, or the location of the top of the tank at such a distance above the ground level that substantial difficulties and additional expense for construction and pumping were involved.

The principal object of this invention is to provide an efficient apparatus of the type indicated, having an upper clarification compartment and a lower digestion compartment, which will be relatively broad and shallow compared to the earlier types of apparatus described. The construction of such an apparatus presents however certain difficulties in connection with the construction and operation both of the clarifier compartment and of the digestion compartment, which heretofore have not been satisfactorily solved. In the construction of the clarifier compartment it is necessary that the walls and bottom be of a material adapted to resist the highly corrosive effects of the liquids and gases encountered in sewage, concrete being by far the most satisfactory material for this purpose. However, the support of a relatively large, comparatively flat bottom of concrete between the clarification and the digestion compartments involves serious problems, particularly when mechanism is employed in the digestion compartment, as hereafter described, that would prevent the use of ordinary supports. It is likewise necessary to provide mechanism for discharging of settled sludge promptly into the digestion compartment, in order to avoid the possibility of septic action.

In the construction and operation of the digestion compartment still more serious problems arise. With a relatively deep compartment as in earlier practice, a given volume of digested sludge will occupy a substantially deep zone in the compartment, and the zones above the digested sludge which are occupied successively by the ripe sludge, partly digested sludge, raw sludge and liquid separated from the raw sludge, are likewise comparatively deep. Consequently the withdrawal of digested sludge from the bottom of the digestion compartment and the introduction of raw sludge at the top of said compartment, will not seriously disturb the adjacent layers or interfere with the orderly process of digestion, which requires a minimum of vertical disturbance of the sludge in various stages of digestion.

With a relatively wide and shallow digestion compartment, however, the same volumes of sludge at the different stages of digestion will occupy relatively shallow zones, so that withdrawal of digested sludge from the bottom at any point or limited number of points will tend to cause vertical disturbance in the layers and to draw out undigested sludge after the digested sludge in the immediate vicinity of the opening is exhausted. Likewise raw sludge introduced through one or a limited number of inlets from the upper sedimentation compartment will tend to be deposited locally beneath the inlets, as there is a limit to the extent to which the raw sludge will spread laterally from its point of introduction. It is likewise important to avoid any definite downward current caused by such introduction of sludge, as such current would produce vertical disturbance in the digesting sludge.

Another problem involves the discharge of a substantial amount of liquid which separates from the raw sludge in the digestion tank, and the disposal of gases generated therein. These problems were readily solved where the sedimentation compartment has a sharply sloping bottom, but involve serious difficulties where the bottom of said compartment, which forms the top of the digestion compartment, is relatively flat. The solution of these problems will be apparent from the specific embodiment hereinafter described. In general, it has been found that the digested sludge when spread over the relatively large area of a shallow digestion compartment can be satisfactorily withdrawn without material disturbance to superposed layers of digested sludge by employing a slowly moving stirring or raking device traveling along the bottom of the digestion compartment, such as rotating rake arms, which when used in this manner serve partly to cause positive propulsion of the digested sludge toward the outlet, and partly to facilitate flow toward said outlet, since the digested sludge is relatively fluid, though thick, and in general flows quite readily when properly stirred. The raking mechanism will also serve to propel positively to the discharge grit or any other foreign material that may have reached the digestion compartment and which would otherwise block the ready lateral flow of the digested sludge along the comparatively flat bottom of the digestion compartment.

The problem of suitable introduction of the raw sludge into the digestion compartment is solved by employing distributor arms traveling beneath the top of the digestion compartment and extending from the sludge inlet toward the side of said compartment, serving to spread the incoming sludge toward the sides and produce a uniform distribution thereof. A suitable baffle below the inlet may be provided to assist in distribution and prevent production of currents, while leaving the opening sufficiently unobstructed so that supernatant liquid may pass upwardly therethrough into the sedimentation compartment.

The gas which is generated in substantial quantities by anaerobic digestion is removed through passages communicating with the upper periphery of the digestion compartment and extending upwardly, preferably outside of the sedimentation compartment, to suitable discharge outlets. One object is to provide an arrangement of this type which can readily be constructed of concrete, and in which the gas outlets are coordinated with the location of the inlet and overflow to and from the sedimentation compartment to provide a compact continuous wall that is readily constructed by standard methods.

The provision of the described mechanism in the digestion compartment introduces a serious problem of support of the bottom of the sedimentation compartment. This has been solved in the form illustrated by employing distributing arms of reduced length with sloping struts supporting the sedimentation compartment, as will be more apparent from the detailed description.

An important object of this invention is to provide an arrangement affording increased facilities for maintaining the proper temperature in the digestion compartment. It is essential for anaerobic bacterial action that the temperature in such compartment be maintained within relatively restricted temperature ranges, since a substantial drop in temperature causes rapid inhibition of bacterial action. The relatively wide and shallow proportions of the apparatus constructed according to this invention as compared to earlier designs permits its location entirely or almost entirely below ground level, without excessive excavation cost, thereby assuring not simply earth insulation for the digestion compartment but likewise similar insulation for the sedimentation compartment. Furthermore, the large area of the digestion compartment makes it difficult to maintain uniform heat therein, since heating coils must necessarily be located at the periphery, where they will be a long distance from the sludge at the center. With the arrangement disclosed however the bottom of the sedimentation compartment serves not simply to prevent heat radiation to the outer air but also assists in heating the sludge in the digestion compartment, since the incoming sewage is always relatively warm, and the sedimentation compartment is insulated at its sides and may readily be insulated at the top if desired, in accordance with standard methods.

Other objects and advantages will be apparent from the following description with the accompanying drawing in which Fig. 1 is a plan view illustrating one embodiment of the invention;

Fig. 2 is a vertical section on line 2—2 of Fig. 1; and

Fig. 3 is a fragmentary section on line 3—3 of Fig. 1 showing in detail the construction of the feed and overflow arrangement.

The digester tank is indicated generally at 10, and is shown as constructed of a suitable material, such as concrete. It includes an upper clarifier compartment 11 and a lower digestion compartment 12 separated by a generally horizontal partition or tray 13. Tray 13 is provided with a suitable outlet for discharging settled raw sludge into digestion compartment 12, such as the central outlet 14 illustrated; and the digestion compartment 12 likewise has one or more outlets at its bottom for the discharge of digested sludge, such as the central discharge outlet 15 communicating with the sludge discharge pipe 16 in the tank bottom 17, which pipe may be connected to a pump or to drying beds into which the sludge may be discharged by gravity in known manner.

Various arrangements for introducing sewage into the clarifier compartment 11 and for overflowing supernatant liquid therefrom may be employed. In the construction shown the sewage is fed across an overflow lip at one side of compartment 11, and the effluent overflows a weir at the opposite side, thereby assuring a full detention period in the sedimentation compartment. This arrangement is particularly advantageous in the present instance since it is applicable to tanks having various contours, such as rectangular tanks, and it likewise permits the utilization of the portions of the tank periphery between the ends of the influent and effluent channels for the gas withdrawal passages. This arrangement permits the construction of a smooth continuous tank of standard contour, without special projections or recesses, a very important item in concrete construction.

In the specific form illustrated the sewage is introduced through an inlet channel 18 connecting with an influent distributing launder 19 running along the side of the clarifier compartment 11 and having a lip 20 over which the sewage flows into said compartment. Supernatant liquid from compartment 11 overflows a similar lip or weir 21 into an overflow discharge channel or launder 22 extending along compartment 11 at a point substantially opposite the influent launder 19 and discharging the effluent into outlet passage 23. Between the ends of feed launder 19 and overflow launder 22 are located gas wells 24 communicating at their lower ends with upper periphery of the digestion compartment 12, said wells preferably being closed at the tops by water-sealed caps 26 with suitably valve-controlled outlet pipes 27 connected to the gas discharge pipes 28, as the gas has been found to be serviceable for heating and power purposes. As indicated, the wells 24 are preferably formed between the outer wall of tank 10 and the side wall of compartment 11.

In the form illustrated the tank 10 is of circular form, and the mechanism for moving settled solids and distributing the sludge is of the rotary type adapted for circular tanks. However, it will be apparent that the invention is not restricted to this arrangement, since other types of mechanism, particularly those adapted to tanks non-circular in shape, are known and may be employed.

In the preferred form illustrated the mechanism is supported on a superstructure or truss 29 carried by buttresses 30 at opposite sides of the tank if desired. Suspended from superstructure 29 in any well known manner is shaft 31 passing downwardly through the opening 14 into compartment 12. Suitable means for impelling to discharge, solids settling in clarifier compartment 11 is mounted on shaft 31, such as a plurality of rake arms 32 provided with suitably inclined blades or rakes 33, connected to shaft 31 by spider 34 and supporting the framework 35, and connected by brace rods 36. A similar structure is mounted on shaft 31 in position to operate at the bottom of the digestion compartment 12, including rake arms 37 mounted on the shaft 31 through spider 38 and supporting framework 39 connected to spider 40, the arms carrying similar rakes 41.

Distributor arms 43 are likewise mounted on shaft 31, being mounted at their inner ends on spider 40 and supported by braces 44 from spider 38. The structure may be reenforced by gusset plates 45 and connected rake arm supports 46 or by any other suitable means.

Radial diaphragm walls 49 separate the gas wells and furnish vertical bearing for the bottom and side wall of compartment 11 at the periphery. Between the gas wells which are surmounted by the water-sealed caps or domes 26, these walls are carried up to the deck, gas tight. Beneath the influent launder 19 and the effluent launder 22 corresponding partitions 50a are stopped sufficiently below the under side of the sloping launder to allow gas to pass laterally into the gas well contiguous to its end.

As already indicated, the relatively large diameter of tray 13, together with the desirability of constructing it of concrete, makes it necessary in many instances to provide vertical support therefore between the side walls, but the employment of rake arms and distributor arms as described makes it difficult to provide such support. It has been found however that the distributor arms 43 do not need to extend to the margin of tray 13; and the preferred construction therefore is provided with a plurality of diagonal struts 47, (only two of which are shown, for purposes of simplicity), which may be constructed of concrete, extending from the side walls of the compartment 12 to the bottom of tray 13 at a point just beyond the path of the shortened distributor arms 43. By having the distributor arms 43 shortened, scum is permitted to accumulate on the underside of the tray 13 which acts as insulation to prevent heat in the sludge in the digester compartment 12 escaping into the contents of the clarifier compartment 11. The struts 47 prevent the tendency of the scum to rotate as a unit with the arms 43. Also by having the arms 43 arranged to conduct the incoming feed to the digester radially outwardly, greater circulation of the incoming sludge is produced within the digester.

It should be noted that in the preferred form shown an inclined surface is provided at the junction of the bottom 17 with the side wall of compartment 12 to prevent undue detention of solids at this point and provide a suitable base for struts 47. Likewise the wall of compartment 12 has a short downward inclination at the entrances to the gas wells 24 for the same purpose. It is also preferable to provide both tray 13 and the upper surface of the tank bottom 17 with a slight slope toward the center, serving to facilitate the flow of solids to the central openings 14 and 15, and likewise facilitating the travel of any gas bubbles located beneath tray 13 to the gas wells 24.

Shaft 31 may be driven in any desired manner, as by means of worm gear 50 on the shaft, driven by worm 51 on sprocket 52 driven through sprocket chain 53 by sprocket 54 on the shaft of gear reducer 56 driven by motor 57, the driving mechanism being mounted on superstructure 29.

While the preferred construction and arrangement have been shown, many changes in the shape of the tank, the feed and outlet, gas removal means, the raking mechanism, and other features, may obviously be made within the scope of the invention as set forth in the claims.

I claim:

1. A combined clarifier and anaerobic digester, including a clarifier compartment of relatively shallow depth compared with its diameter and having an outlet at its bottom, mechanical means to impel the raw sludge towards said outlet, an anaerobic digester compartment beneath said clarifier compartment to receive the raw sludge therefrom, mechanical means to impel the digested sludge along the bottom of the digester compartment to said outlet, an influent inlet for the clarifier compartment, and a single effluent outlet.

2. A combined clarifier and anaerobic digester, including a clarifier compartment of relatively shallow depth compared with its diameter and having a central outlet at its bottom, mechanical means to impel the raw sludge toward said outlet, an anaerobic digester compartment beneath said clarifier compartment to receive the raw sludge therefrom and having a central outlet, mechanical means for distributing the raw sludge over the digester compartment, and mechanical means for impelling the digested sludge toward the central outlet of the digester compartment.

3. A combined clarifier and anaerobic digester, including a clarifier compartment of relatively shallow depth compared with its diameter and having a central outlet, mechanical means for impelling the raw sludge toward said outlet, an anaerobic digester compartment beneath said clarifier compartment to receive raw sludge therefrom, said digester compartment having a central outlet for digested sludge and gas outlet means at its periphery, said outlets constituting the sole means for discharging material from the digester compartment, and mechanical means for impelling the digested sludge toward the central outlet thereof.

4. A combined clarifier and anaerobic digester, including a clarifier compartment of relatively shallow depth compared with its length and having a central outlet, mechanical means for impelling the raw sludge toward said outlet, an anaerobic digester compartment beneath said clarifier compartment to receive raw sludge therefrom, said digester compartment having a central outlet for digested sludge and means for withdrawing gas at its periphery, mechanical means for distributing the raw sludge over the digester compartment, and mechanical means for impelling the digested sludge to the corresponding outlet.

5. A combined clarifier and anaerobic digester including an upper clarifier compartment of relatively shallow depth compared with the diameter and an anaerobic digester compartment beneath the clarifier compartment to receive such raw sludge therefrom and having in its bottom an outlet for digested sludge, mechanical means to maintain substantial uniformity of horizontal distribution of sludge in the varying stages of digestion from the top to the bottom of the digester compartment and a plurality of gas-collecting means associated with the digester compartment.

6. A combined clarifier and anaerobic digester including an upper clarifier compartment of relatively shallow depth compared with its diameter and having at its bottom an outlet for raw sludge, a lower anaerobic digester compartment to receive such raw sludge and having a central bottom outlet, mechanical means to maintain substantial uniformity of horizontal distribution of sludge in the varying stages of digestion from the top to the bottom of the digester compartment, and a plurality of independent gas-collecting means associated with the digester compartment.

7. A combined clarifier and anaerobic digester including an upper clarifier compartment of relatively shallow depth compared with its diameter and having at its bottom an outlet for raw sludge, a lower anaerobic digester compartment to receive such raw sludge and having an outlet at its bottom, and means to maintain substantial uniformity of horizontal distribution of sludge in the varying stages of digestion from the top to the bottom of the digester compartment, including means at the top of the digester compartment to distribute the raw sludge as it is received from the clarifier compartment.

8. A combined clarifier and anaerobic digester including an upper clarifier compartment of relatively shallow depth compared with its diameter and having at its bottom an outlet for raw sludge, a lower digester compartment to receive such raw sludge, and having an outlet at its bottom, and means to maintain substantial uniformity of horizontal distribution of sludge in the varying stages of digestion from the top to the bottom of the digester compartment, including mechanical means at the bottom of the digester compartment to cause the digested sludge to flow smoothly along the bottom to the outlet and means at the top of the digester compartment to distribute raw sludge over the upper part thereof.

9. A combined clarifier and anaerobic digester including an upper clarifier compartment of relatively shallow depth compared with its diameter and having at its bottom an outlet for raw sludge, a lower digester compartment to receive such raw sludge, and having an outlet at its bottom, and means to maintain substantial uniformity of horizontal distribution of sludge in the varying stages of digestion from the top to the bottom of the digester tank, and means for withdrawing gas from said digester compartment at its periphery, said outlets constituting the sole means for discharging material from the digester compartment.

10. A combined clarifier and anaerobic digester, including a receptacle divided by a transverse tray into a lower digester compartment and an upper clarifier compartment, each of which is shallow compared with its diameter, said tray having a central opening for the passage of raw sludge to the digester compartment and said digester compartment having an outlet at its bottom, and gas collecting means including wells communicating with said digester compartment at its periphery and extending upwardly, above the level of liquid in the clarifier compartment.

11. Apparatus for treating sewage, including a receptacle divided by a transverse tray into a lower compartment and an upper compartment, and means for supporting the tray including struts extending upwardly and inwardly to the tray from the lower compartment adjacent to its periphery.

12. Apparatus for treating sewage, including a receptacle divided by a transverse tray into a lower compartment and an upper compartment, said tray having a central opening for the passage of raw sludge to the lower compartment and the bottom of the lower compartment having a central opening for the discharge of digested sludge therefrom, a shaft through the central opening in the tray, a rake structure mounted on said shaft adjacent the bottom of the lower compartment, a scraper structure of smaller range mounted on said shaft adjacent to the lower surface of the tray, and supporting struts extending from points on the bottom of the lower compartment out of range of said rake structure to points on the bottom of the tray out of range of said scraper structure.

13. In a closed digester for sewage and the like, a tank having a wall, sludge removing means for the tank, gas removing means for the tank, and gas-collecting reservoirs arranged peripherally in the wall of the tank.

14. The apparatus according to claim 13 with the addition of a common divisional wall between adjacent gas-collecting reservoirs.

15. A combined sewage clarifier and digester unit, including a clarifier compartment having spaced apart inlet and overflow launders; each extending over part of the periphery of said compartment, and a central outlet; mechanical means for impelling the raw sludge toward said outlet, a digester compartment subjacent to said clarifier compartment to receive raw sludge therefrom, said digester compartment having an outlet for digested sludge, and gas collecting means at each side of the unit and disposed in alternation with said inlet launder and said overflow launder, said gas collecting means comprising a plurality of chambers extending side by side along the periphery of the unit, said launders and said gas collectors presenting a crosswise symmetrical arrangement, and mechanical means for impelling the digested sludge toward the outlet of said digester compartment.

JOHN F. SKINNER.